United States Patent
Ku

(10) Patent No.: US 6,291,956 B1
(45) Date of Patent: Sep. 18, 2001

(54) TEMPERATURE CONTROLLED RADIATING FAN

(75) Inventor: Antony Ku, Hsin-Chuang (TW)

(73) Assignee: Taiwan Da-Long Industrial Co., Ltd., Taipei Hsien (TW)

(*) Notice: Subject to any disclaimer, the term of this patent is extended or adjusted under 35 U.S.C. 154(b) by 0 days.

(21) Appl. No.: 09/562,627

(22) Filed: May 2, 2000

(51) Int. Cl.$^7$ .................................................... H02P 7/00
(52) U.S. Cl. .......................... 318/445; 318/471; 318/473
(58) Field of Search ..................... 318/471–484, 318/430–466; 361/20–38; 388/934, 907.2; 374/130, 125, 132; 62/186, 408; 399/92, 94

(56) References Cited

U.S. PATENT DOCUMENTS

| | | | |
|---|---|---|---|
| 4,124,001 | * | 11/1978 | Samuel et al. . |
| 5,718,373 | * | 2/1998 | Kim et al. . |
| 5,831,405 | * | 11/1998 | Massie . |
| 5,925,948 | * | 7/1999 | Matsumoto . |
| 5,929,581 | * | 7/1999 | Van Brocklin et al. . |
| 5,957,582 | * | 9/1999 | Gillen et al. . |
| 5,983,653 | * | 11/1999 | Lee . |
| 5,999,768 | * | 12/1999 | Gillen et al. . |
| 6,011,371 | * | 1/2000 | Van Brocklin et al. . |
| 6,024,487 | * | 2/2000 | Gillen et al. . |

* cited by examiner

Primary Examiner—Paul Ip
(74) Attorney, Agent, or Firm—Rosenberg, Klein & Lee

(57) ABSTRACT

A temperature controlled radiating fan comprises a temperature detector, a control circuit, a power control circuit, a regulator, a loading circuit, and a driving circuit. The temperature detector is connected to the control circuit. The output of the control circuit is connected to the power control circuit. The output of the power control circuit is connected to the loading circuit. The output of the loading circuit is connected to the driving circuit. The power control circuit is connected to the regulator. Thereby, the rotary speed of the fan motor is varied according to a voltage variation, so that the characteristic of the rotary speed of the fan motor is linearly changed.

3 Claims, 4 Drawing Sheets

TEMPERATURE CONTROLLED RADIATING FAN

FIELD OF THE INVENTION

The present invention relates to a temperature controlled radiating fan, and especially to radiating fan wherein the rotary speed of the fan motor is varied according to a voltage variation, so that the characteristic of the rotary speed of the fan motor is linearly changed.

BACKGROUND OF THE INVENTION

In the prior art temperature controlled radiating fan, a pulse width modulation (PWM) serves to change the modulation way of the rotary speed of the fan motor, such as those disclosed in Taiwan Patent No. 0327486, "DC brushless fan PWM control circuit", No. 0152583, "PWM DC brushless radiating fan", and No. 0146147, "AC motor stageless speed change PWM control".

However, the prior art designs have the disadvantages of larger volume, many components, high manufacturing cost, worse linearity. Thus, there is an eager demand for a temperature controlled radiating fan having a control circuit which is varied linearly according to a voltage variation.

SUMMARY OF THE INVENTION

Accordingly, the primary object of the present invention is to provide a temperature controlled radiating fan. The temperature controlled radiating fan comprises a temperature detector, a control circuit, a power control circuit, a regulator, a loading circuit and a driving circuit. Thereby, the rotary speed of the fan motor is varied according to a voltage variation, so that the characteristic of the rotary speed of the fan motor is linearly changed.

Another object of the present invention is to provide a temperature controlled radiating fan which has the advantages of a small volume, a low cost and a preferred characteristic.

The various objects and advantages of the present invention will be more readily understood from the following detailed description when read in conjunction with the appended drawing.

DETAILED DESCRIPTION OF THE PREFERRED EMBODIMENTS

Figure 1:
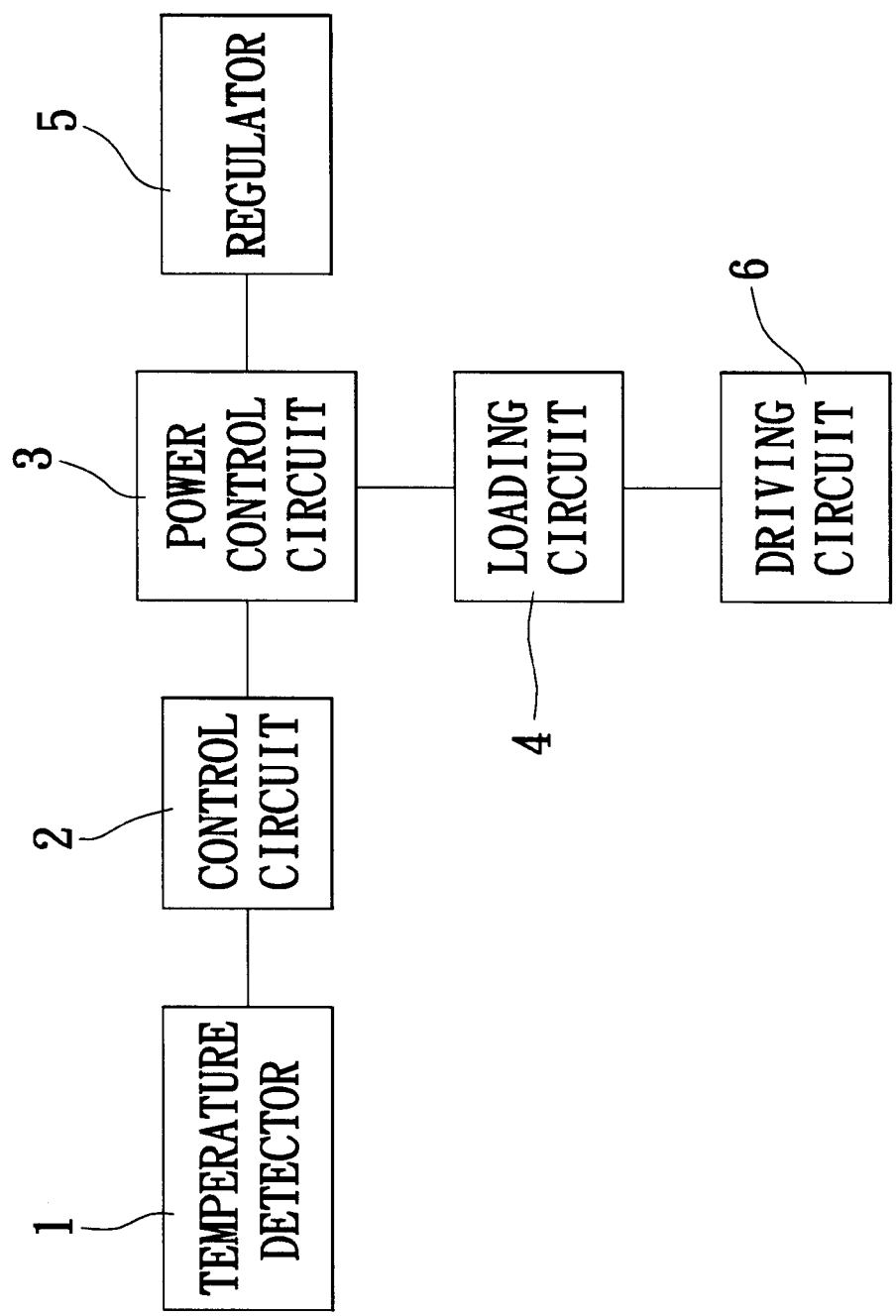
FIG. 1 shows a circuit block of the present invention.
Figure 2:
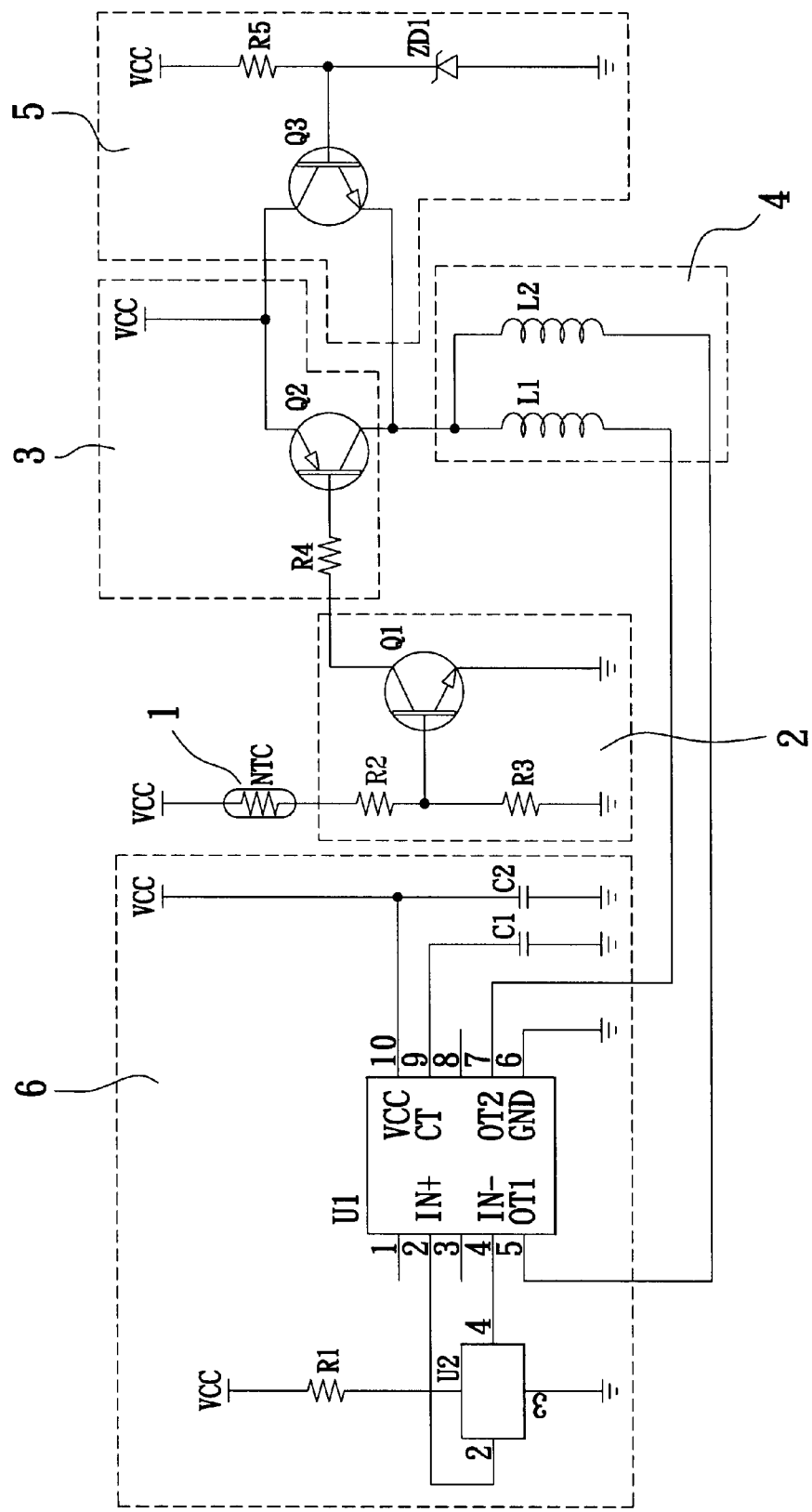
FIG. 2 shows a circuit of the present invention.

With reference to FIGS. 1 and 2, The temperature controlled radiating fan of the present invention is illustrated herein. The temperature controlled radiating fan has a temperature detector 1, a control circuit 2, a power control circuit 3, a loading circuit 4, a regulator 5, a driving circuit 6, and other unit.

The temperature detector 1 is a thermistor (NTS). The resistance of the thermistor is inversely proportional to the temperature variation. Namely, as temperature increases, the resistance of the resistance reduces. As temperature reduces, the resistance of the thermistor increased.

The input end of the control circuit 2 is connected to the temperature detector 1 and is formed by connecting the transistor Q1, resistor R1 and R2. The control circuit 2 is operated according to the variation of the resistance of the temperature detector 1. Namely, when the resistance of the temperature detector 1 reduces so that the voltage between two ends of the resistor R3 is larger than that between the base and emitter of the transistor Q1, the transistor Q1 is conductive. On the contrary, the transistor Q1 will not conduct.

The power control circuit 3 is connected to the collector of the transistor Q1 of the control circuit 2 and is formed by connecting the power source Vcc, transistor Q2, and resistor R4. The transistor Q2 of the power control circuit 3 is actuated when the transistor Q1 is conductive.

The regulator 5 is connected to the collector of the transistor Q2 of the power control circuit 3 and is formed by connected a transistor Q3, a resistor R5, a Zener diode Z1, and other elements.

The regulator 5 provides power to the fan motor when the motor rotates in a low speed. That is, when the transistor Q2 does not conduct, the voltage of the Zener diode ZD1 is larger than the voltage between the base and emitter of the transistor Q3 so that the transistor Q3 is conductive and thus sustained in a low potential.

The loading circuit 4 is connected to the collector of the transistor Q2 of the power control circuit 3 and the emitter of the transistor Q3 of the regulator 5. The loading circuit is formed by connecting inductance L1 and L2. The output end of the loading circuit 4 is connected to a driving circuit 6 formed by IC U1 and U2 and capacitor C1 and C2.

The loading circuit 4 is actuated by the stimulation of the output voltage of the power control circuit 3 and the regulator 5.

Figure 3:
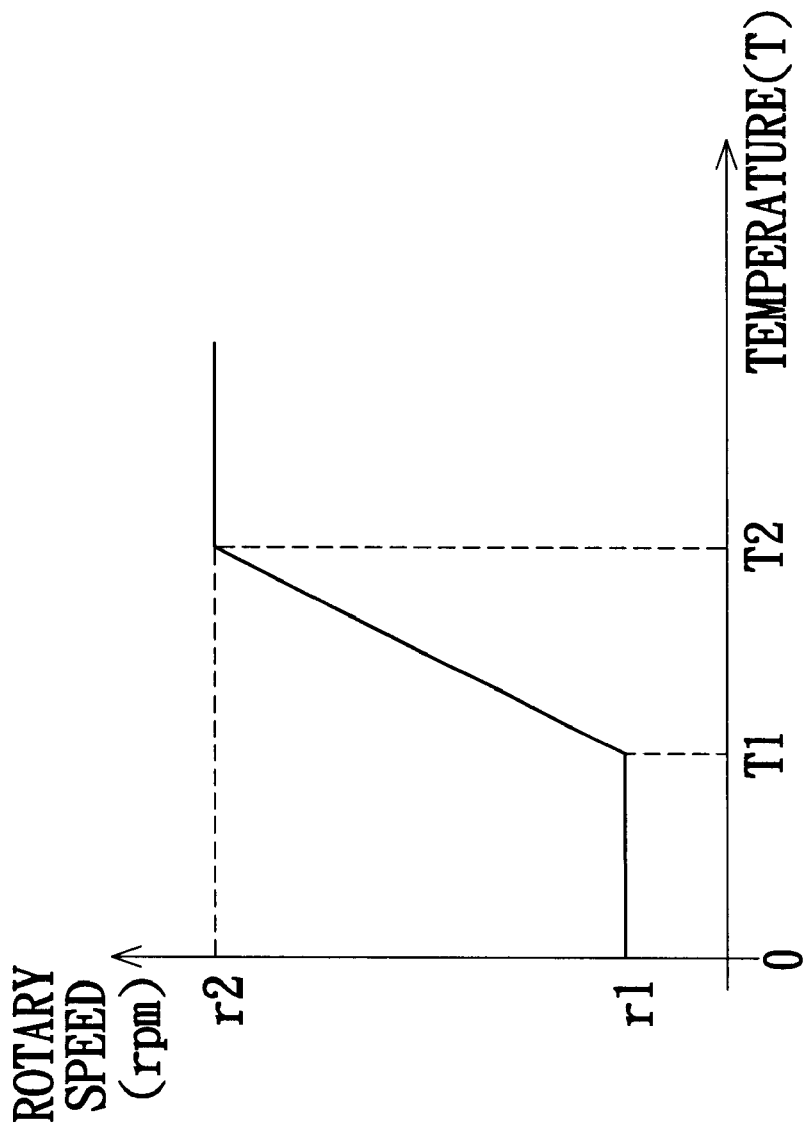
FIG. 3 shows a characteristic curve of the rotary speed of the fan motor and the temperature variation.

Referring to FIG. 3, the characteristic curve of the fan motor and temperatures are illustrated.

As temperature is between 0–T1, the resistance of the temperature detector 1 increases so that the transistor Q1 does not conduct. Now, the transistor Q3 conducts so that the emitter of the transistor Q3 is retained in a low level. Therefore, the coils L1 and L2 are stimulated due to the low level and thus, the rotary speed of the fan motor is retained in a preset value (r1).

When the temperature (T1–T2) increase, the resistance of the temperature detector reduces, and thus, the transistor Q1 conducts. As a result, the potential of the collector in the transistor Q1 reduces. Therefore, the transistor Q2 conducts so that the rotary speed of the fan motor (r1–r2) is linearly varied according to the potential of the collector of the transistor Q2.

As temperature is increased to a predetermined value (T2) so that the collector of the transistor Q2 is retained in a high level. Then, the rotary speed of the fan motor is retained in a setting value (r2).

Figure 4:
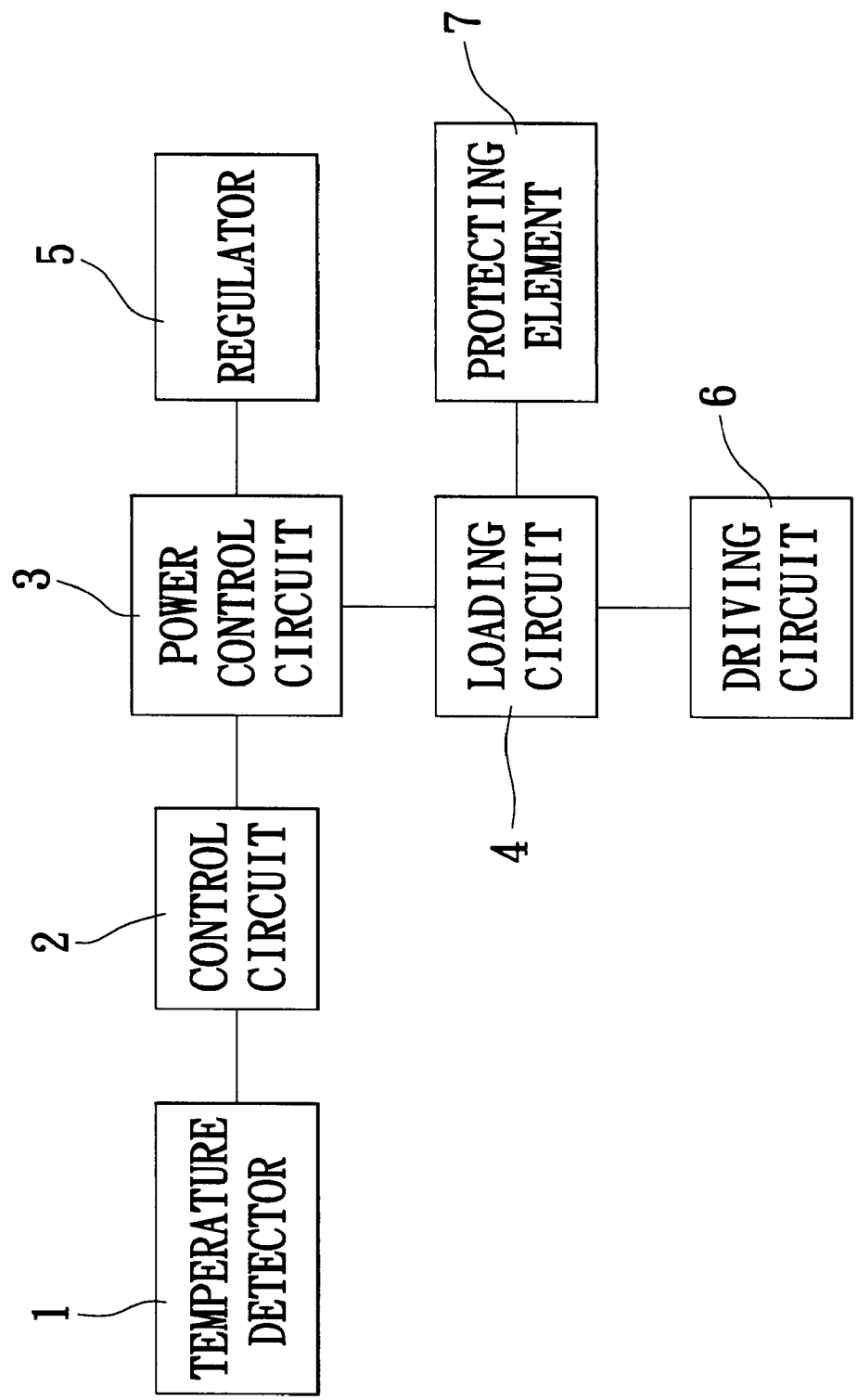
FIG. 4 shows an embodiment of the present invention.

Referring to FIG. 4, in the present invention, a protecting element (diode) 7 can be connected between the loading circuit 4 and the regulator 5 for preventing that the transistor Q3 is burned out.

In summary, the voltage adjusting of the present invention has the following advantage:

(1) A good working characteristic curve.

(2) A small volume.

(3) Less peripheral components.

(4) Lower cost.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A temperature controlled radiating fan comprising:

a motor driving circuit which is actuated by stimulation of a voltage;

a temperature detector having a resistance inversely proportionally to the variation of temperature;

a control circuit connected to the temperature detector, the control circuit being actuated according to the resistance of the temperature detector;

a power control circuit connected to an output of the control circuit, an output of the power control circuit being connected to the motor driving circuit and the power control circuit being actuated as the control circuit is conductive; and a regulator connected to the power control circuit for providing power as a fan motor is in a low rotary speed;

wherein the rotary speed of the fan motor is varied according to a voltage variation, so that the characteristic of the rotary speed of the fan motor is linearly changed.

2. The temperature controlled radiating fan as claimed in claim 1, wherein a protecting element is serially connected between the loading circuit and the regulator.

3. The temperature controlled radiating fan as claimed in claim 1, wherein the protecting element is a diode.

* * * * *